United States Patent
Siddaramappa et al.

(10) Patent No.: US 10,233,976 B2
(45) Date of Patent: Mar. 19, 2019

(54) VEHICLE DRIVETRAIN ASSEMBLY HAVING A CLUTCH COLLAR ACTUATOR MECHANISM

(71) Applicant: Meritor Commercial Vehicle Systems India Private Limited, Bangalore (IN)

(72) Inventors: Dhananjaya Siddaramappa, Bangalore (IN); Supreeth Chandrashekar, Bangalore (IN); Kishan Kumar Udupi, Bangalore (IN); Prashanth Kuruba, Bangalore (IN)

(73) Assignee: Meritor Commercial Vehicle Systems India Private Limited, Bangalore (IN)

( * ) Notice: Subject to any disclaimer, the term of this patent is extended or adjusted under 35 U.S.C. 154(b) by 269 days.

(21) Appl. No.: 15/347,608

(22) Filed: Nov. 9, 2016

(65) Prior Publication Data
US 2017/0146072 A1 May 25, 2017

(30) Foreign Application Priority Data
Nov. 20, 2015 (IN) .......................... 6269/CHE/2015

(51) Int. Cl.
*F16D 11/10* (2006.01)
*F16D 23/12* (2006.01)
(Continued)

(52) U.S. Cl.
CPC .............. *F16D 11/10* (2013.01); *F16D 23/12* (2013.01); *F16D 25/048* (2013.01); *F16D 25/12* (2013.01);
(Continued)

(58) Field of Classification Search
CPC .......... F16D 11/10; F16D 23/12; F16D 25/12; F16D 25/048; F16D 2023/126;
(Continued)

(56) References Cited

U.S. PATENT DOCUMENTS

| 4,452,331 A | 6/1984 | Lunn et al. |
| 5,123,513 A | 6/1992 | Petrak |

(Continued)

FOREIGN PATENT DOCUMENTS

| DE | 102008040206 A1 | 1/2010 |
| DE | 102009037428 A1 | 2/2010 |

(Continued)

OTHER PUBLICATIONS

The State Intellectual Property Office of the People'S Republic of China, First Office Action for Application No. CN201610700706.8, dated Aug. 3, 2018, 8 pages.

(Continued)

*Primary Examiner* — Jacob S. Scott
*Assistant Examiner* — Lillian T Nguyen
(74) *Attorney, Agent, or Firm* — Brooks Kushman P.C.

(57) ABSTRACT

A vehicle drivetrain assembly having a clutch collar actuator mechanism. The clutch collar actuator mechanism may include an air bellow and a fork that may operatively connect an actuator rod to a clutch collar. The clutch collar actuator mechanism may actuate the clutch collar from a first position to a second position when the air bellow is inflated.

20 Claims, 6 Drawing Sheets

(51) Int. Cl.
  *F16D 25/04* (2006.01)
  *F16D 25/12* (2006.01)
  *F16H 48/08* (2006.01)
  *F16H 48/24* (2006.01)
  *F16D 11/00* (2006.01)

(52) U.S. Cl.
  CPC ............. *F16H 48/08* (2013.01); *F16H 48/24* (2013.01); *F16D 2011/002* (2013.01); *F16D 2023/126* (2013.01)

(58) Field of Classification Search
  CPC .... F16D 2011/002; F16H 48/24; F16H 48/08; F16H 48/32
  See application file for complete search history.

(56) References Cited

U.S. PATENT DOCUMENTS

| | | | |
|---|---|---|---|
| 5,342,255 A | * | 8/1994 | Slesinski ................. F15B 15/24 475/230 |
| 5,673,777 A | | 10/1997 | Ziech |
| 6,582,334 B1 | | 6/2003 | Noll |
| 6,918,851 B2 | | 7/2005 | Ziech et al. |
| 7,211,017 B2 | | 5/2007 | Green et al. |
| 8,651,994 B2 | | 2/2014 | Bassi et al. |
| 9,109,635 B2 | | 8/2015 | Boothby et al. |
| 9,719,563 B2 | | 8/2017 | Hirao |
| 9,989,139 B2 | | 6/2018 | Martin |
| 10,113,628 B2 | | 10/2018 | Kluck et al. |
| 2007/0199404 A1 | | 8/2007 | Mason |
| 2008/0242469 A1 | | 10/2008 | Jenski et al. |
| 2012/0277051 A1 | | 11/2012 | Cooper et al. |
| 2014/0179484 A1 | | 6/2014 | Fox et al. |

FOREIGN PATENT DOCUMENTS

| | | |
|---|---|---|
| DE | 102008043486 A1 | 4/2010 |
| EP | 1731798 A1 | 12/2006 |
| EP | 2366926 A1 | 9/2011 |
| GB | 2019511 A | 10/1979 |
| WO | 2008049626 A1 | 5/2008 |
| WO | 2010012288 A1 | 2/2010 |

OTHER PUBLICATIONS

Continental, ContiTech, Single Convolution Air Spring, FS 22-3 DI CR, Apr. 1, 2014, 1 page.
Continental, ContiTech, Single Convolution Air Spring, FS 40-6 CI, Apr. 1, 2014, 1 page.
European Patent Office, Extended European Search Report for the corresponding European Patent Application No. 16184492.3 dated Apr. 18, 2017.
Australia Government, IP Australia, Examination Report No. 1 for standard patent application for corresponding Australian patent application No. 2016216647, dated Apr. 11, 2017, 6 pages.

* cited by examiner

VEHICLE DRIVETRAIN ASSEMBLY HAVING A CLUTCH COLLAR ACTUATOR MECHANISM

TECHNICAL FIELD

This disclosure relates to a vehicle drivetrain assembly having a clutch collar actuator mechanism.

BACKGROUND

An inter-axle differential lock shift mechanism is disclosed in U.S. Pat. No. 7,211,017.

SUMMARY

In at least one embodiment, a vehicle drivetrain assembly is provided. The vehicle drivetrain assembly may include a housing assembly, a shaft, a clutch collar, and a clutch collar actuator mechanism. The shaft may be disposed in the housing assembly and may rotate about an axis. The clutch collar may be movably disposed on the shaft. The clutch collar actuator mechanism may actuate the clutch collar and may include an actuator rod, a fork, a cap, and an air bellow. The fork may operatively connect the actuator rod to the clutch collar. The cap may be disposed on the housing assembly. The air bellow may be disposed between the actuator rod and the cap. The clutch collar may move from a first position to a second position when the air bellow is inflated.

In at least one embodiment, a vehicle drivetrain assembly is provided. The vehicle drivetrain assembly may include a housing assembly, a shaft, a clutch collar, and a clutch collar actuator mechanism. The shaft may be disposed in the housing assembly and may rotate about an axis. The clutch collar may be movably disposed on the shaft. The clutch collar actuator mechanism may actuate the clutch collar. The clutch collar actuator mechanism may include an actuator rod, a fork, a cap, and air bellow, and a biasing member. The actuator rod may extend along an actuation axis. The fork may operatively connect the actuator rod to the clutch collar. The cap may have a port. The air bellow may be fluidly connected to the port and may be disposed between the actuator rod and the cap. The clutch collar may move from a first position to a second position when the air bellow is inflated. The biasing member may actuate the clutch collar from the second position to the first position when the air bellow is deflated.

In at least one embodiment, a vehicle drivetrain assembly is provided. The vehicle drivetrain assembly may include a housing assembly, a shaft, a clutch collar, and a clutch collar actuator mechanism. The shaft may be disposed on the housing assembly and may rotate about an axis. The clutch collar may be movably disposed on the shaft. The clutch collar actuator mechanism may actuate the clutch collar. The clutch collar actuator mechanism may include an actuator rod, a fork, a cap, and air bellow, and a biasing member. The actuator rod may extend along an actuation axis. The fork may extend from the actuator rod to the clutch collar. The cap may have a port and may be disposed on the housing assembly. The air bellow may be fluidly connected to the port and may be disposed between the actuator rod and the cap. The air bellow may have a mounting panel and an inflatable bladder. The mounting panel may be disposed proximate the actuator rod. The inflatable bladder may have an air bellow port that may be fluidly connected to the port of the cap. The clutch collar may move from a first position to a second position when the air bellow is inflated. The biasing member may actuate the clutch collar from the second position to the first position when the air bellow is deflated.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
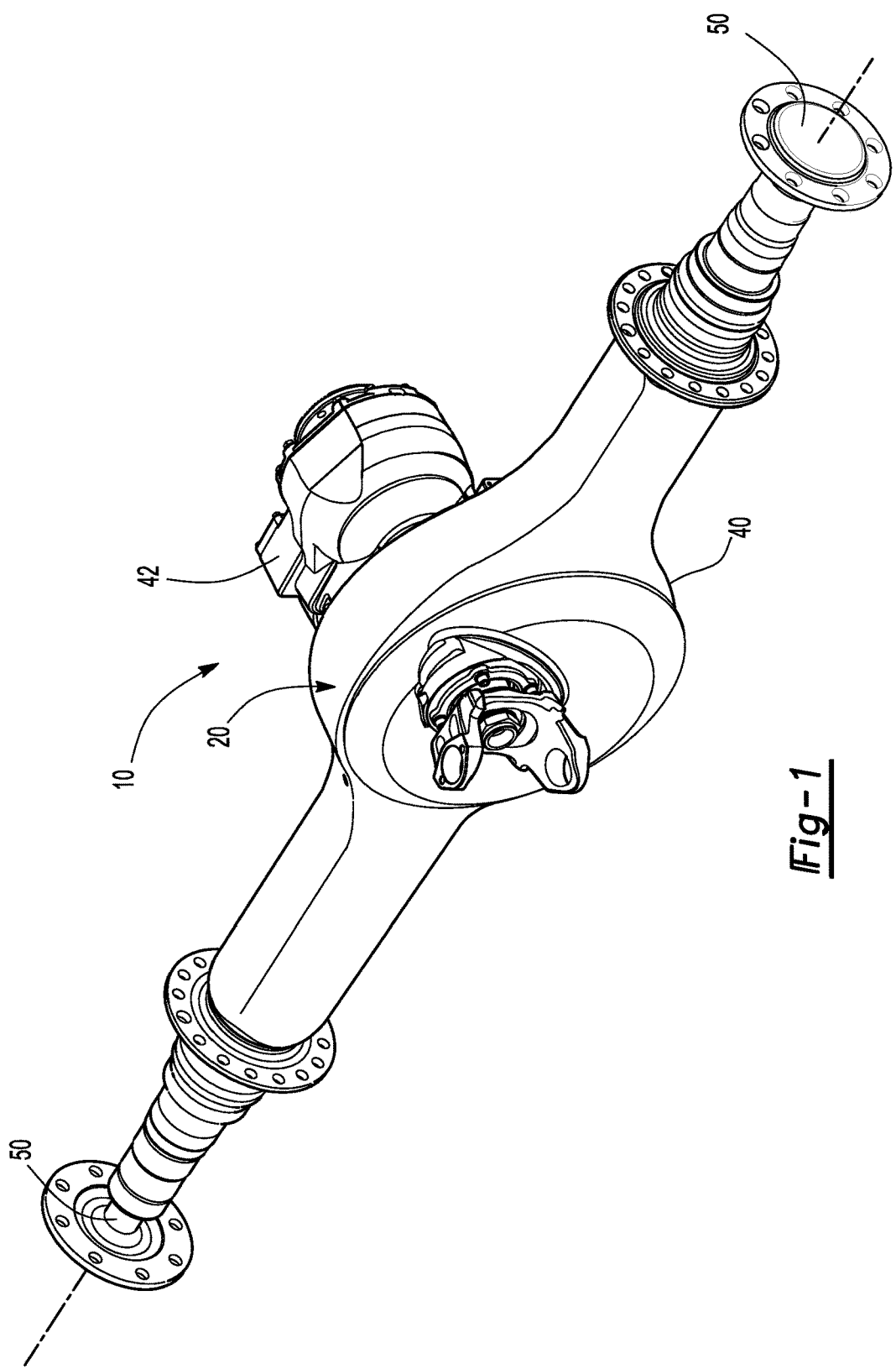
FIG. 1 is a perspective view of a vehicle drivetrain assembly.

Referring to FIG. 1, an exemplary vehicle drivetrain assembly 10 is shown. The vehicle drivetrain assembly 10 may be provided with a vehicle, such as a motor vehicle like a truck, bus, farm equipment, military transport or weaponry vehicle, or cargo loading equipment for land, air, or marine vessels.

The vehicle drivetrain assembly 10 may be configured to provide torque to a vehicle wheel. For example, the vehicle drivetrain assembly 10 may be an axle assembly, transfer case, or wheel end assembly. The vehicle drivetrain assembly 10 is described below primarily in the context of an axle assembly. For instance, the vehicle drivetrain assembly 10 may be a drive axle or drive axle assembly that may provide torque to one or more traction wheel assemblies that may include a tire mounted on a wheel. The drive axle assembly may receive torque from a power source, such as an engine. For example, the power source may be operatively coupled to the input of a transmission and an output of the transmission may be directly or indirectly coupled to an input of the drive axle assembly, such as with a drive shaft.

A vehicle drivetrain assembly 10 that is configured as an axle assembly may provide torque to a second axle assembly that may be connected in series with the vehicle drivetrain assembly 10. For example, two axle assemblies may be provided in a tandem axle configuration. The first axle assembly or axle assembly that is first in the series may be referred to as a forward-rear axle assembly. The second axle assembly may be referred to as a rear-rear axle assembly. An output of the first axle assembly may be selectively coupled to an input of the second axle assembly, such as with a prop shaft.

Figure 2:
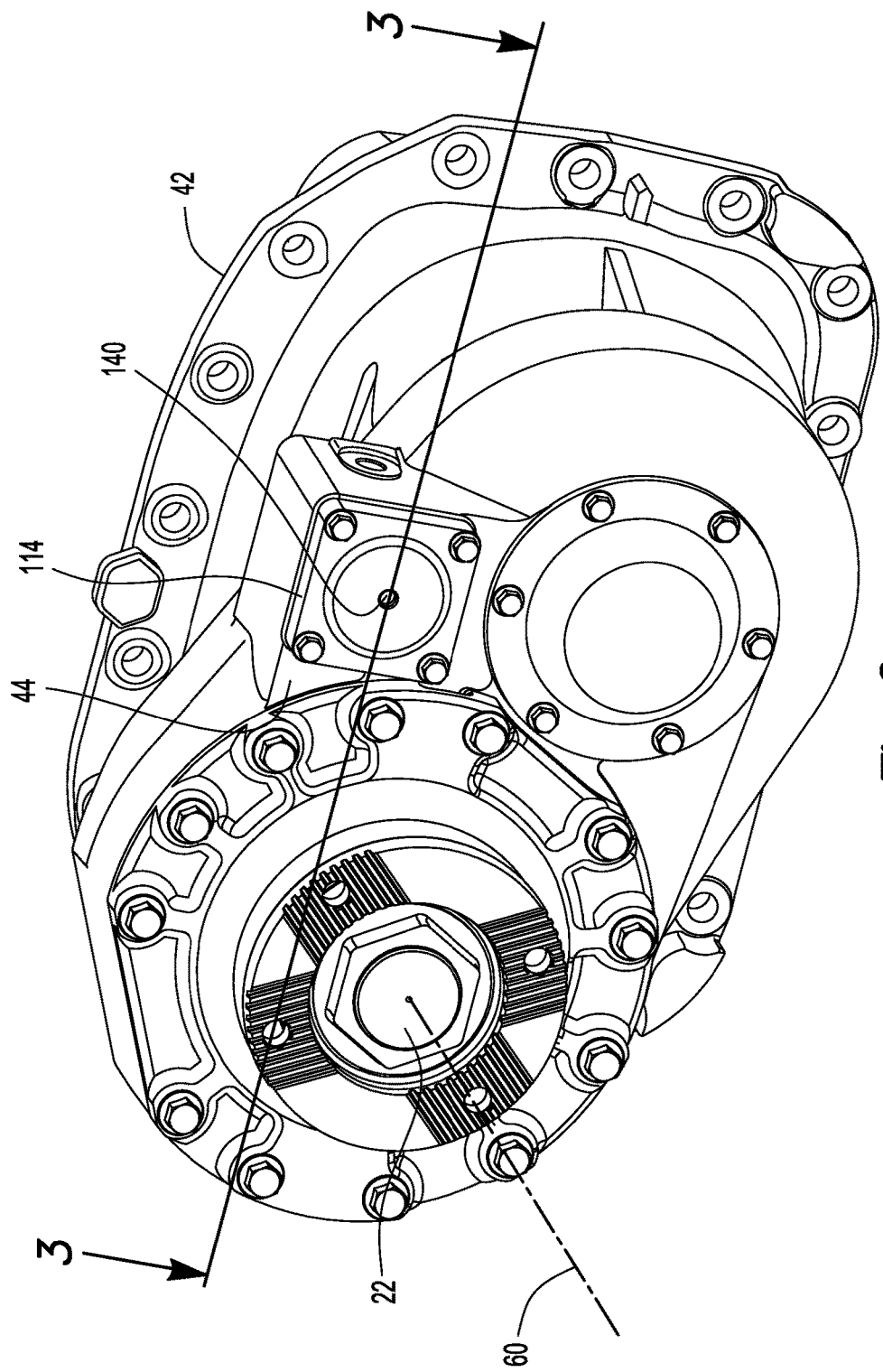
FIG. 2 is a perspective view of a portion of the vehicle drivetrain assembly.
Figure 3:
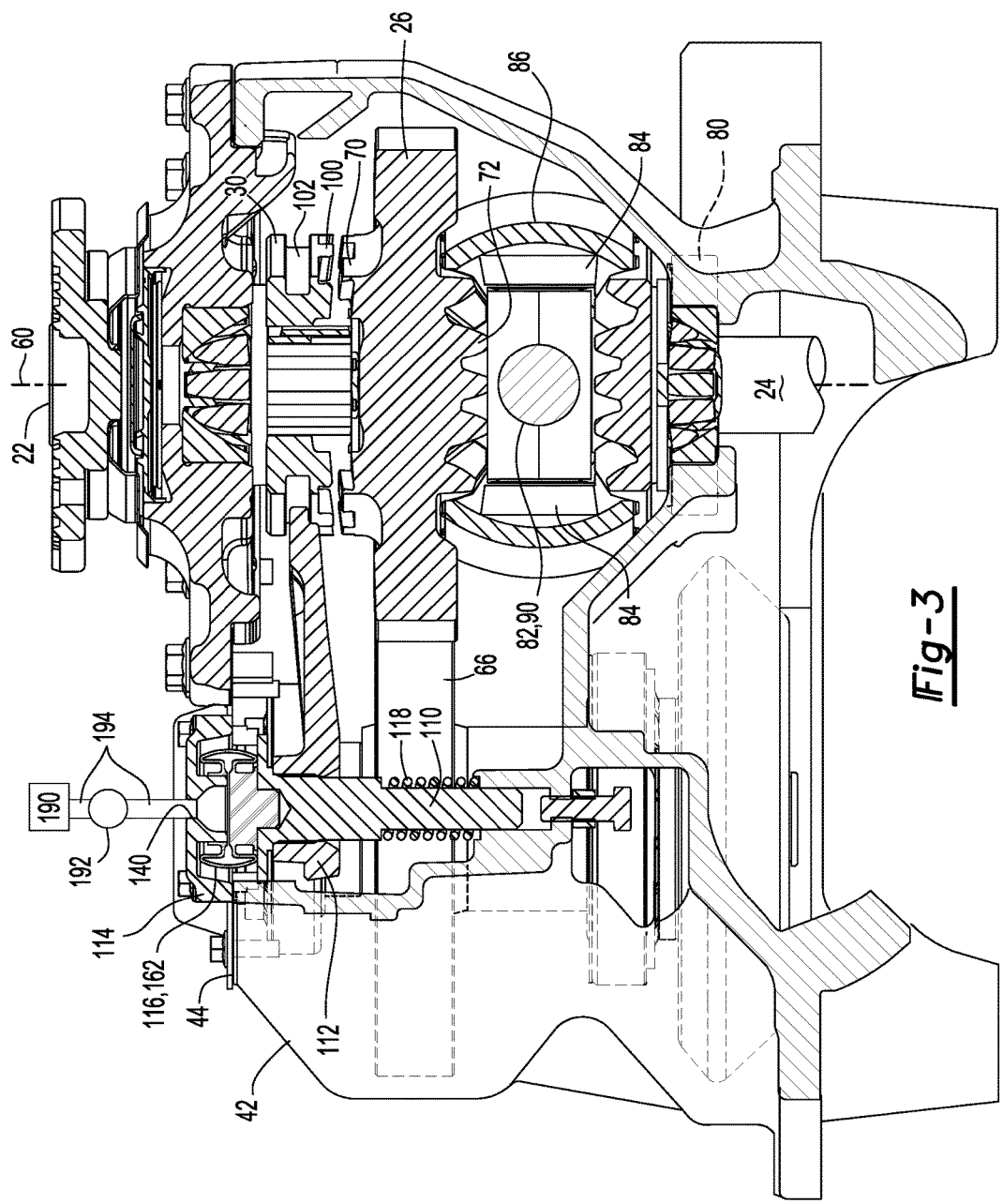
FIG. 3 is a section view along section line 3-3 showing a clutch collar in a first position.

Referring to FIGS. 1-3, an example of a vehicle drivetrain assembly 10 is shown in more detail. As an overview, the vehicle drivetrain assembly 10 may have a differential unit that may compensate for speed differences between two shafts that may be coupled to the differential unit. The vehicle drivetrain assembly 10 is primarily shown and described with respect to a differential unit that is configured as an interaxle differential unit that may compensate for speed differences between different drive axle assemblies, such as speed differences between first and second axle assemblies; however, it is to be understood that the differential unit may not be an interaxle differential unit. For instance, it is contemplated that the differential unit may be an axle differential unit that may compensate for speed differences between different wheel axle shafts or different vehicle wheels, or the differential unit may be a wheel end differential unit that may be provided with a wheel end assembly that may rotatably support a vehicle wheel and may provide gear reduction or gear ratio modification between an axle shaft and a vehicle wheel. Examples of an axle differential unit and a wheel end differential unit are disclosed in U.S. patent application Ser. No. 14/742739 and U.S. Pat. No. 9,109,635, respectively, and are hereby incorporated by reference in their entirety.

In at least one embodiment, the vehicle drivetrain assembly 10 may include a housing assembly 20, a first shaft 22, a second shaft 24, a lockable component 26, a differential unit 28, a clutch collar 30, and a clutch collar actuator mechanism 32.

Referring to FIG. 1, the housing assembly 20 may receive various components of the vehicle drivetrain assembly 10. In addition, the housing assembly 20 may facilitate mounting of the vehicle drivetrain assembly 10 to the vehicle. The housing assembly 20 may include an axle housing 40 and a differential carrier 42 when the vehicle drivetrain assembly 10 is configured as an axle assembly. The housing assembly 20 may also have an exterior surface 44, which may be defined by at least one of the axle housing 40 and the differential carrier 42 when the vehicle drivetrain assembly 10 is configured as an axle assembly.

The axle housing 40 may receive a pair of axle shafts 50 and may support the wheel assemblies. The axle housing 40 may include a center portion and a pair of arm portions. The center portion may be disposed proximate the center of the axle housing 40. The center portion may define an opening that may face toward the differential carrier 42 and may have a cavity that may receive at least a portion of the differential unit 28 when the differential unit 28 is an axle differential unit. In such a configuration, the differential unit 28 may be configured to transmit torque to its associated wheel assemblies via the axle shafts 50 and permit the wheel assemblies to rotate at different velocities. The arm portions may extend in opposite directions from the center portion and may each receive an axle shaft 50.

The differential carrier 42 may be mounted on the axle housing 40. For example, the differential carrier 42 may be mounted on the center portion of the axle housing 40 with a plurality of fasteners, such as bolts. The differential carrier 42 may support the differential unit 28, such as when the differential unit 28 is an axle differential unit or an interaxle differential unit.

The first shaft 22 may be operatively coupled to the differential unit 28. The first shaft 22 may be an input shaft or an output shaft depending on the configuration of the differential unit 28. For instance, the first shaft 22 may be an input shaft that may be disposed between a power source and the differential unit 28 when the differential unit 28 is configured as an interaxle differential unit. The first shaft 22 may be an output shaft, such as an axle shaft 50 or a shaft that may be operatively connected to an axle shaft 50, when the differential unit 28 is configured as an axle differential unit.

The second shaft 24 may also be operatively coupled to the differential unit 28. The second shaft 24 may be an output shaft that may receive torque from the differential unit 28. For instance, the second shaft 24 may be an output shaft that may be disposed between the differential unit 28 and a second axle assembly when the differential unit 28 is configured as an interaxle differential unit. The second shaft 24 may be an output shaft, such as a second axle shaft or a shaft that may be operatively connected to a second axle shaft, when the differential unit 28 is configured as an axle differential unit. In at least one embodiment, the first shaft 22 and the second shaft 24 may extend along and may rotate about an axis 60 as is best shown in FIGS. 2 and 3.

Referring to FIG. 3, the lockable component 26 may be disposed proximate a shaft, such as the first shaft 22. The lockable component 26 may or may not be part of the differential unit 28. For instance, the lockable component 26 may be a drive gear when the differential unit 28 is configured as an interaxle differential unit, may be a case of the differential unit 28 when the differential unit 28 is configured as an axle differential unit, and may be a wheel hub when the differential unit 28 is provided at a wheel end assembly. In the case of a lockable component 26 that is a drive gear, the drive gear may provide torque to a driven gear 66, which may in turn provide torque to a pinion, a ring gear, an axle differential unit, and axle shafts 50 of the axle assembly. The drive gear may have a center bore that may receive a roller bearing that may be disposed on the first shaft 22 and that may rotatably support the drive gear. The roller bearing, if provided, may allow the drive gear to rotate about or with respect to the first shaft 22 under certain operating conditions.

The lockable component 26 may include a first face gear 70 that may have a set of teeth that may be arranged around the axis 60. The first face gear 70 may be located on a side or face of the lockable component 26 that may face toward the clutch collar 30. The teeth of the first face gear 70 may selectively engage teeth on the clutch collar 30 as will be discussed in more detail below. In some configurations, such as when the lockable component 26 is a drive gear or part of an interaxle differential unit, a second face gear 72 may be provided. The second face gear 72 may be disposed on an opposite side of the drive gear from the first face gear 70.

The differential unit 28 may help control rotation of a first shaft 22 with respect to the second shaft 24. For example, the differential unit 28 may permit the first shaft 22 and the second shaft 24 to rotate at different speeds or may inhibit the first shaft 22 and the second shaft 24 from rotating at different speeds depending on the position of the clutch collar 30. In FIG. 3, an exemplary differential unit 28 is shown that is configured as an interaxle differential unit. Such a differential unit 28 may include an output gear 80, a spider 82, a plurality of pinion gears 84, and a case 86.

The output gear 80 may be disposed proximate the second shaft 24. For example, the output gear 80 may extend along the axis 60 and may have a center bore that may receive an end of the second shaft 24. The output gear 80 may not rotate about the axis 60 with respect to the second shaft 24.

The spider 82 may be fixedly disposed on the first shaft 22. For instance, the spider 82 may include a center bore that may include splines that may mate with corresponding splines on the first shaft 22 to help align and secure the spider 82 to the first shaft 22. As such, the spider 82 may rotate about the axis 60 with the first shaft 22. The spider 82 may also include one or more pins 90 that may extend away from the center bore of the spider 82.

A pinion gear 84 may be rotatably disposed on the pin(s) 90 of the spider 82. The pinion gear 84 may include teeth that may mate with the second gear 72 of the drive gear and may mate with teeth on the output gear 80.

The case 86 may receive and position various components of the differential unit 28, such as the output gear 80, spider 82, and pinion gear(s) 84. The case 86 may rotate about the axis 60 with the spider 82. The case 86 may be located adjacent to the lockable component 26, such as when the differential unit 28 is an interaxle differential unit, or may be the lockable component 26, such as when the differential unit 28 is an axle differential unit. In a differential unit 28 that is configured as an axle differential unit, the case 86 may have a case gear that may include a set of teeth that may be arranged on a side or face of the case 86 that faces toward the clutch collar 30. The clutch collar 30 may selectively engage the case gear to lock the axle differential unit and may disengage the case gear to unlock the axle differential unit.

The clutch collar 30 may be moveably disposed on a shaft, such as the first shaft 22. For instance, the clutch collar 30 may be configured to move or slide axially or along the axis 60 of the shaft. The clutch collar 30 may be generally ring-shaped and may include a gear portion 100 and an annular groove 102.

Figure 4:
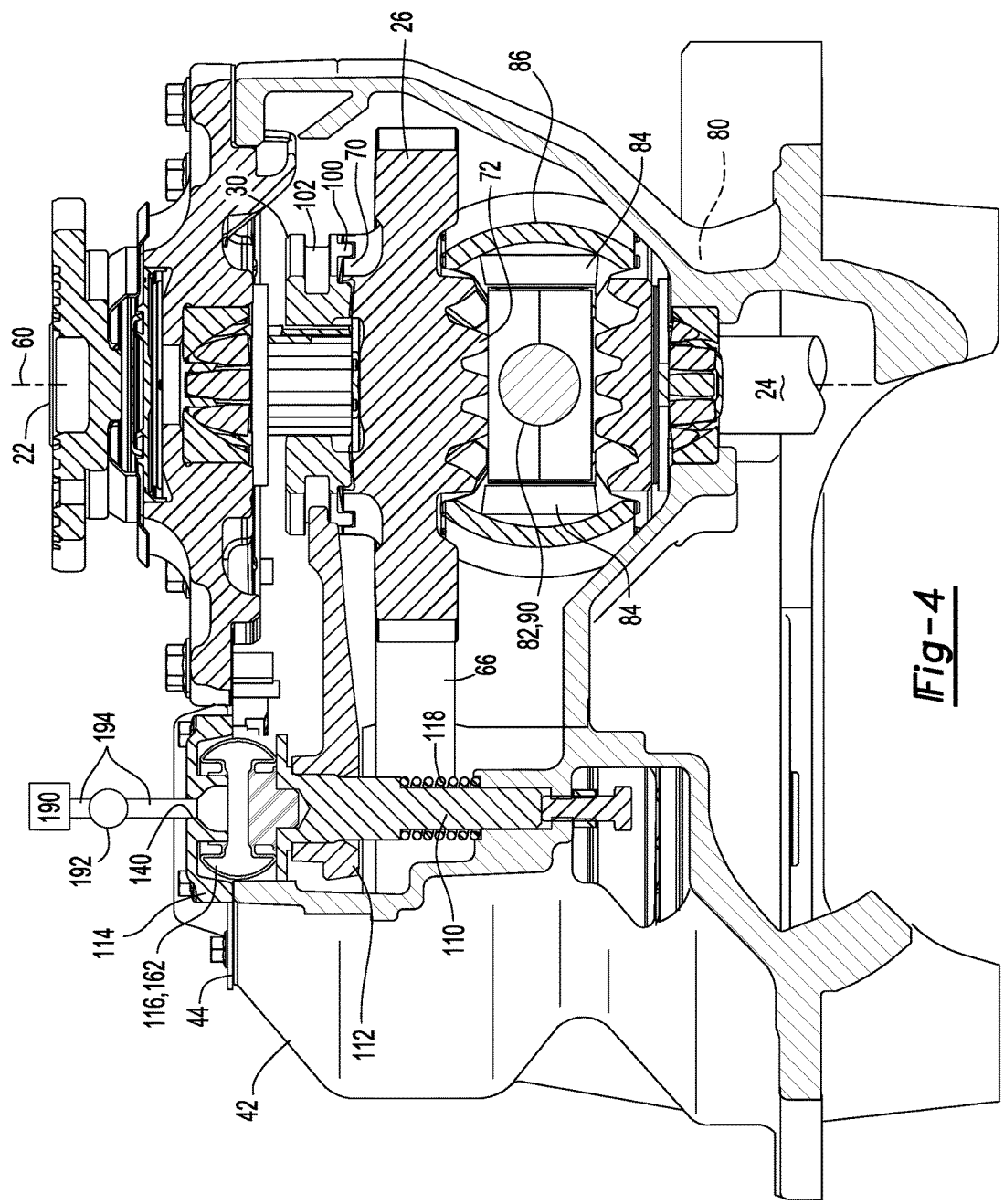
FIG. 4 is a section view showing the clutch collar in a second position.
Figure 5:
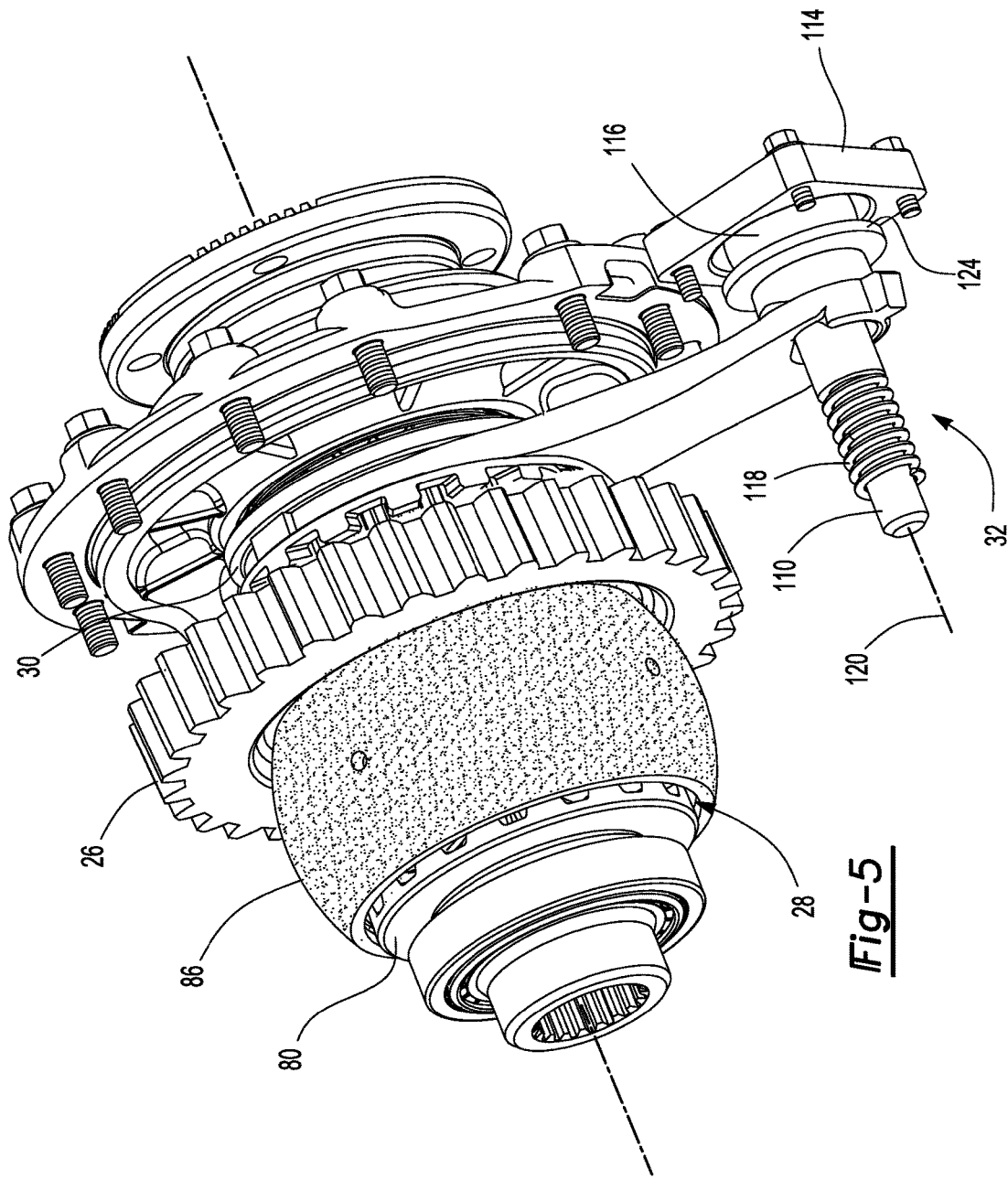
FIG. 5 is a perspective view of a portion of the vehicle drivetrain assembly including a clutch collar actuator mechanism and the clutch collar.

The gear portion 100 may include a set of teeth that may be arranged on a side or face of the clutch collar 30 that faces toward the lockable component 26. The teeth of the gear portion 100 may selectively engage corresponding teeth on the lockable component 26. The gear portion 100 may not mate or mesh with the teeth of the lockable component 26 when the clutch collar 30 is in a first position or a locked position as shown in FIG. 3 and may mate or mesh with the teeth of the lockable component 26 when the clutch collar 30 is in a second position or locked position as shown in FIG. 4. In the locked position, the clutch collar 30 may be couple the lockable component 26 to a shaft, such as the first shaft 22, such that the lockable component 26 and first shaft 22 rotate together about an axis, such as axis 60. As such, the first shaft 22 and the second shaft 24 may rotate together and may not rotate at different velocities. In the unlocked position, the clutch collar 30 may not mate or mesh with the teeth of the lockable component 26, which may permit the first shaft 22 and the second shaft 24 to rotate at different velocities.

The annular groove 102 may be spaced apart from the gear portion 100. The annular groove 102 may extend continuously around the clutch collar 30 and may receive a portion of the clutch collar actuator mechanism 32 as will be described in more detail below.

Referring to FIGS. 3-6, the clutch collar actuator mechanism 32 may facilitate axial positioning of the clutch collar 30 along a shaft or with respect to a shaft, such as positioning along the axis 60 of the first shaft 22. The clutch collar actuator mechanism 32 may be at least partially disposed within the housing assembly 20. The combination of the clutch collar 30 and the clutch collar actuator mechanism 32 may collectively be referred to as a driver controlled differential lock ("DCDL") when employed with a differential unit 28 that is configured as an axle differential unit. In at least one embodiment, the clutch collar actuator mechanism 32 may include an actuator rod 110, a fork 112, a cap 114, an air bellow 116, and a biasing member 118.

The actuator rod 110 may be configured to actuate the fork 112 and the clutch collar 30. The actuator rod 110 may be completely disposed inside the housing assembly 20 and may extend along an actuation axis 120. In at least one embodiment, the actuator rod 110 may include a shaft portion 122 and an enlarged head 124.

Figure 6:
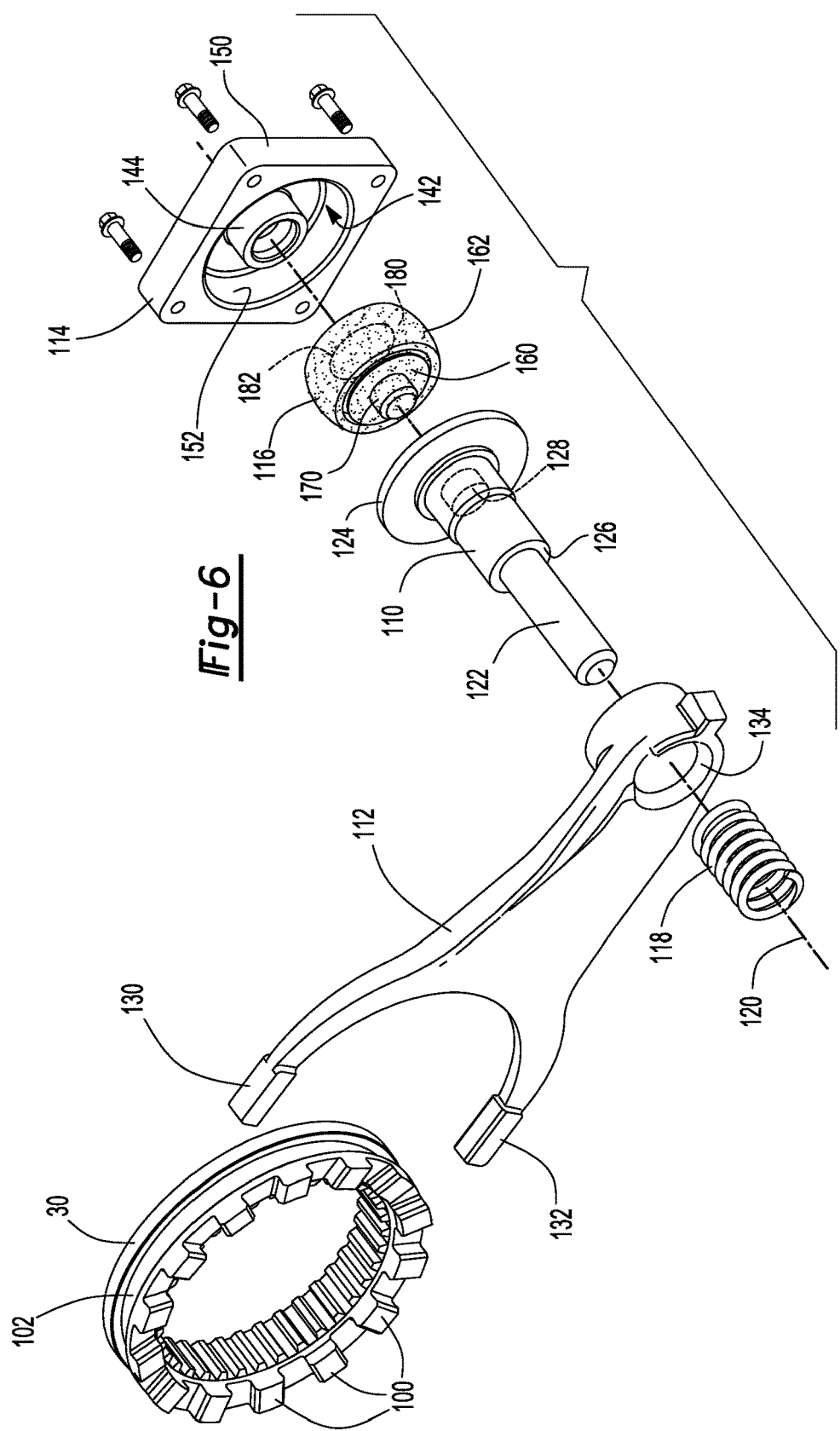
FIG. 6 is an exploded view showing the clutch collar actuator mechanism and the clutch collar.

As is best shown in FIG. 6, the shaft portion 122 may extend along the actuation axis 120 and may facilitate mounting of the fork 112. The shaft portion 122 may have a step 126 that may extend away from the actuation axis 120 and may be disposed between a distal end of the shaft portion 122 and the enlarged head 124.

The enlarged head 124 may be disposed at an end of the shaft portion 122. The enlarged head 124 may extend further from the actuation axis 120 than the shaft portion 122. The enlarged head 124 may be disposed proximate and may engage the air bellow 116. In addition, the enlarged head 124 may have a hole 128 that may facilitate positioning and mounting of the air bellow 116 as will be discussed in more detail below.

The fork 112 may operatively connect the actuator rod 110 to the clutch collar 30. For instance, the fork 112 may extend from the actuator rod 110 to the clutch collar 30. In at least one embodiment, the fork 112 may include a first prong 130, a second prong 132, and a fork hole 134.

The first prong 130 and the second prong 132 may facilitate coupling of the fork 112 to the clutch collar 30. For example, the first prong 130 and the second prong 132 may be received in the annular groove 102 of the clutch collar 30. The first prong 130 and the second prong 132 may be spaced apart from each other.

The fork hole 134 may be disposed at an end of the fork 112 that may be disposed opposite the first prong 130 and the second prong 132. The fork hole 134 may receive the shaft portion 122 of the actuator rod 110. The shaft portion 122 may be fixedly received in the fork hole 134 such that the fork 112 is fixedly disposed on the actuator rod 110.

Referring to FIGS. 1, 2, and 6, the cap 114 may be disposed on the housing assembly 20. For example, the cap 114 may be disposed on the exterior surface 44 of the housing assembly 20 and may be attached to the housing assembly 20 in any suitable manner, such as with one or more fasteners, such as screws or bolts. In at least one embodiment, the cap 114 may include a port 140, a cavity 142, and a coupling ring 144.

The port 140 may be configured as a through hole that may extend through the cap 114. In at least one embodiment, the port 140 may be disposed along the actuation axis 120. The port 140 may facilitate inflation and deflation of the air bellow 116 as will be discussed in more detail below.

The cavity 142 may be a recess that is defined by the cap 114. The cavity 142 may at least partially receive the air bellow 116 and the coupling ring 144. In at least one embodiment, the cavity 142 may be open in a direction that faces toward the actuator rod 110 and may be at least partially defined by a first cavity wall 150 and a second cavity wall 152. The first cavity wall 150 may include the port 140. The second cavity wall 152 may extend from the first cavity wall 150 and may extend around the coupling ring 144 and the air bellow 116.

The coupling ring 144 may be disposed in the cavity 142 and may extend from the first cavity wall 150 toward the actuator rod 110. The coupling ring 144 may extend around the port 140 and may be disposed between the port 140 and the second cavity wall 152. The coupling ring 144 may fluidly connect the port 140 the air bellow 116. For instance, the coupling ring 144 may be received in the air bellow 116 and may directly seal against the air bellow 116 to allow pressurized gas to pass through the inside of the coupling ring 144 two enter or exit the air bellow 116. In at least one embodiment, the coupling ring 144 may extend around the actuation axis 120.

The air bellow 116 may be fluidly connected to the port 140, such as via the coupling ring 144. The air bellow 116 may be at least partially disposed in the cavity 142 and may be disposed between the actuator rod 110 and the cap 114. The air bellow 116 may have any suitable configuration. In at least one embodiment, the air bellow 116 may have a mounting panel 160 and an inflatable bladder 162.

The mounting panel 160 may facilitate mounting of the air bellow 116 to the actuator rod 110. The mounting panel 160 may be generally disposed between the enlarged head 124 of the actuator rod 110 and the inflatable bladder 162. The mounting panel 160 may include a pin 170. The pin 170 may be disposed opposite the coupling ring 144 and may extend along the actuation axis 120. The pin 170 may be received in the hole 128 in the enlarged head 124. As such, the pin 170 may help position the actuator rod 110 with respect to the air bellow 116 and may couple the actuator rod 110 to the air bellow 116. It is also contemplated that the mounting panel 160 may be integrally formed with the inflatable bladder 162 in one or more embodiments.

The inflatable bladder 162 may extend between the mounting panel 160 and the cap 114. The inflatable bladder 162 may define an internal chamber 180 that may receive pressurized gas. The inflatable bladder 162 may include an air bellow port 182 that may permit pressurized gas to enter or exit the internal chamber 180. In at least one embodiment, the air bellow port 182 may be configured as a ring that may receive the coupling ring 144 of the cap 114. As such, the air bellow port 182 may seal directly against the coupling ring 144 in one or more embodiments. The inflatable bladder 162 may be made of a flexible material, such as rubber, that may allow the inflatable bladder 162 to expand and contract in response to providing pressurized gas to the inflatable bladder 162 or venting pressurized gas from the inflatable bladder 162. As one example, the inflatable bladder 162 may be single convolution air spring such as may be made by ContiTech. It is also contemplated that the inflatable bladder 162 may be coupled to a second mounting panel which in turn may receive the coupling ring 144.

The biasing member 118 may actuate the clutch collar 30 to disengage the differential unit 28. More specifically, the biasing member 118 may exert a biasing force that may actuate the clutch collar 30 along the actuation axis 120 from the second position to the first position when the air bellow 116 is deflated or when the biasing force overcomes the force exerted by the air bellow 116. The biasing member 118 may have any suitable configuration. For example, the biasing member 118 may be configured as one or more springs. In at least one embodiment, the biasing member 118 may extend between the housing assembly 20 and the actuator rod 110. For instance, the biasing member 118 may extend from the housing assembly 20 to the step 126 on the shaft portion 122 of the actuator rod 110. The biasing member 118 and the air bellow 116 may be disposed on opposite sides of the fork 112. In addition, the biasing member 118 may extend around and may receive the shaft portion 122.

Referring to FIG. 3, operation of the clutch collar actuator mechanism 32 will now be discussed. A pressurized gas source 190 may be associated with the vehicle drivetrain assembly 10. The pressurized gas source 190 may be fluidly connected to the clutch collar actuator mechanism 32 and the inflatable bladder 162 via at least one valve 192 and one or more conduits 194. The conduit 194, which may be a hose or tube, may be fluidly connected to the port 140. The valve 192 may be controlled by an electronic controller. The valve 192 may permit pressurized gas to flow from the pressurized gas source 190 to the internal chamber 180 of the inflatable bladder 162 inflate the inflatable bladder 162, which then exerts force against the actuator rod 110. The actuator rod 110 and the fork 112 can then move along the actuation axis 120, thereby moving the clutch collar 30 from the first position to the second position. The clutch collar 30 may be engaged with the differential unit 28 when in the second position.

The valve 192 may be further actuated to vent pressurized gas from the internal chamber 180 of the inflatable bladder 162. Releasing or venting pressurized fluid from the internal chamber 180 may allow the actuator rod 110 to move from the second position to the first position under the biasing force of the biasing member 118. The extended position is shown in phantom in FIG. 3. Movement of the actuator rod 110 to the first position may be limited by the coupling ring 144.

The clutch collar actuator mechanism described above may provide various benefits as compared to other actuator mechanisms that may use a piston, diaphragm, or solenoid to actuate a fork and a collar. These benefits may include easier assembly, reduced package space, fewer seals and potential leak paths, improved durability, and reduced maintenance.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle drivetrain assembly comprising:
   a housing assembly;
   a shaft that is disposed in the housing assembly and that rotates about an axis;
   a clutch collar that is moveably disposed on the shaft;
   a clutch collar actuator mechanism that actuates the clutch collar, the clutch collar actuator mechanism including:
      an actuator rod;
      a fork that operatively connects the actuator rod to the clutch collar;
      a cap disposed on the housing assembly; and
      an air bellow that is disposed between the actuator rod and the cap, wherein the air bellow has a mounting panel that engages the actuator rod and an inflatable bladder that extends from the mounting panel to the cap, wherein the mounting panel and the inflatable bladder cooperate to define a chamber that receives pressurized gas;
   wherein the clutch collar moves from a first position to a second position when the air bellow is inflated.

2. The vehicle drivetrain assembly of claim 1 wherein the clutch collar actuator mechanism further comprises a biasing member that actuates the clutch collar from the second position to the first position when the air bellow is deflated.

3. The vehicle drivetrain assembly of claim 2 wherein the biasing member and the air bellow are disposed on opposite sides of the fork.

4. The vehicle drivetrain assembly of claim 1 wherein the cap has a cavity that receives the air bellow.

5. The vehicle drivetrain assembly of claim 1 wherein the actuator rod is moveable along an actuation axis, the mounting panel has a pin that extends along the actuation axis and is received in the actuator rod, and the cap has a coupling ring disposed opposite the pin that extends around a port and around the actuation axis and is disposed in the air bellow.

6. The vehicle drivetrain assembly of claim 1 wherein the mounting panel moves away from the cap when pressurized gas is provided to the chamber and the mounting panel moves toward the cap when pressurized gas is vented from the chamber.

7. The vehicle drivetrain assembly of claim 1 wherein the clutch collar actuator mechanism is disposed in a differential carrier of the housing assembly.

8. A vehicle drivetrain assembly comprising:
a housing assembly;
a shaft that is disposed in the housing assembly and that rotates about an axis;
a clutch collar that is moveably disposed on the shaft;
a clutch collar actuator mechanism that actuates the clutch collar, the clutch collar actuator mechanism including:
an actuator rod that extends along an actuation axis;
a fork that operatively connects the actuator rod to the clutch collar;
a cap that has a cavity, a coupling ring that is disposed in the cavity, and a port;
an air bellow that is fluidly connected to the port and is disposed between the actuator rod and the cap, wherein the coupling ring is received in an air bellow port in the air bellow and the clutch collar moves from a first position to a second position when the air bellow is inflated; and
a biasing member that actuates the clutch collar from the second position to the first position when the air bellow is deflated.

9. The vehicle drivetrain assembly of claim 8 wherein the cap disposed on an exterior of the housing assembly.

10. The vehicle drivetrain assembly of claim 8 wherein the actuator rod has a shaft portion upon which the fork is disposed and an enlarged head that engages the air bellow and is disposed outside the cap.

11. The vehicle drivetrain assembly of claim 8 wherein the actuator rod is moveable along the actuation axis, the air bellow has a mounting panel that has a pin that extends along the actuation axis and is received in a hole in the actuator rod, and the coupling ring is disposed opposite the pin and extends around the port and around the actuation axis.

12. The vehicle drivetrain assembly of claim 8 wherein the coupling ring extends around the port and fluidly connects the port to the air bellow.

13. The vehicle drivetrain assembly of claim 12 wherein the coupling ring extends around the actuation axis.

14. The vehicle drivetrain assembly of claim 13 wherein the coupling ring and the port are disposed along the actuation axis.

15. A vehicle drivetrain assembly comprising:
a housing assembly;
a shaft that is disposed in the housing assembly and that rotates about an axis;
a clutch collar that is moveably disposed on the shaft;
a clutch collar actuator mechanism that actuates the clutch collar, the clutch collar actuator mechanism including:
an actuator rod that extends along an actuation axis;
a fork that extends from the actuator rod to the clutch collar;
a cap that has a port and is disposed on the housing assembly;
an air bellow that is fluidly connected to the port and is disposed between the actuator rod and the cap, wherein the air bellow has a mounting panel that is disposed proximate the actuator rod and an inflatable bladder that has an air bellow port that is fluidly connected to the port of the cap, wherein the clutch collar moves from a first position to a second position when the air bellow is inflated; and
a biasing member that actuates the clutch collar from the second position to the first position when the air bellow is deflated.

16. The vehicle drivetrain assembly of claim 15 wherein the air bellow has a pin that is received in a hole in the actuator rod.

17. The vehicle drivetrain assembly of claim 16 wherein the cap has a coupling ring that is disposed in the air bellow and wherein the pin is disposed opposite the coupling ring.

18. The vehicle drivetrain assembly of claim 16 wherein the pin extends along the actuation axis.

19. The vehicle drivetrain assembly of claim 16 wherein the pin extends from the mounting panel.

20. The vehicle drivetrain assembly of claim 16 wherein the vehicle drivetrain assembly is an axle assembly.

* * * * *

UNITED STATES PATENT AND TRADEMARK OFFICE
CERTIFICATE OF CORRECTION

Page 1 of 1

PATENT NO. : 10,233,976 B2
APPLICATION NO. : 15/347608
DATED : March 19, 2019
INVENTOR(S) : Dhananjaya Siddaramappa et al.

It is certified that error appears in the above-identified patent and that said Letters Patent is hereby corrected as shown below:

In the Claims

Column 9, Lines 37-38, Claim 9:
After "wherein the cap"
Insert -- is --.

Signed and Sealed this
Sixth Day of August, 2019

Andrei Iancu
*Director of the United States Patent and Trademark Office*